May 8, 1951 H. R. ETZLER 2,552,038
SHAFT COUPLING
Filed March 25, 1949 2 Sheets-Sheet 1
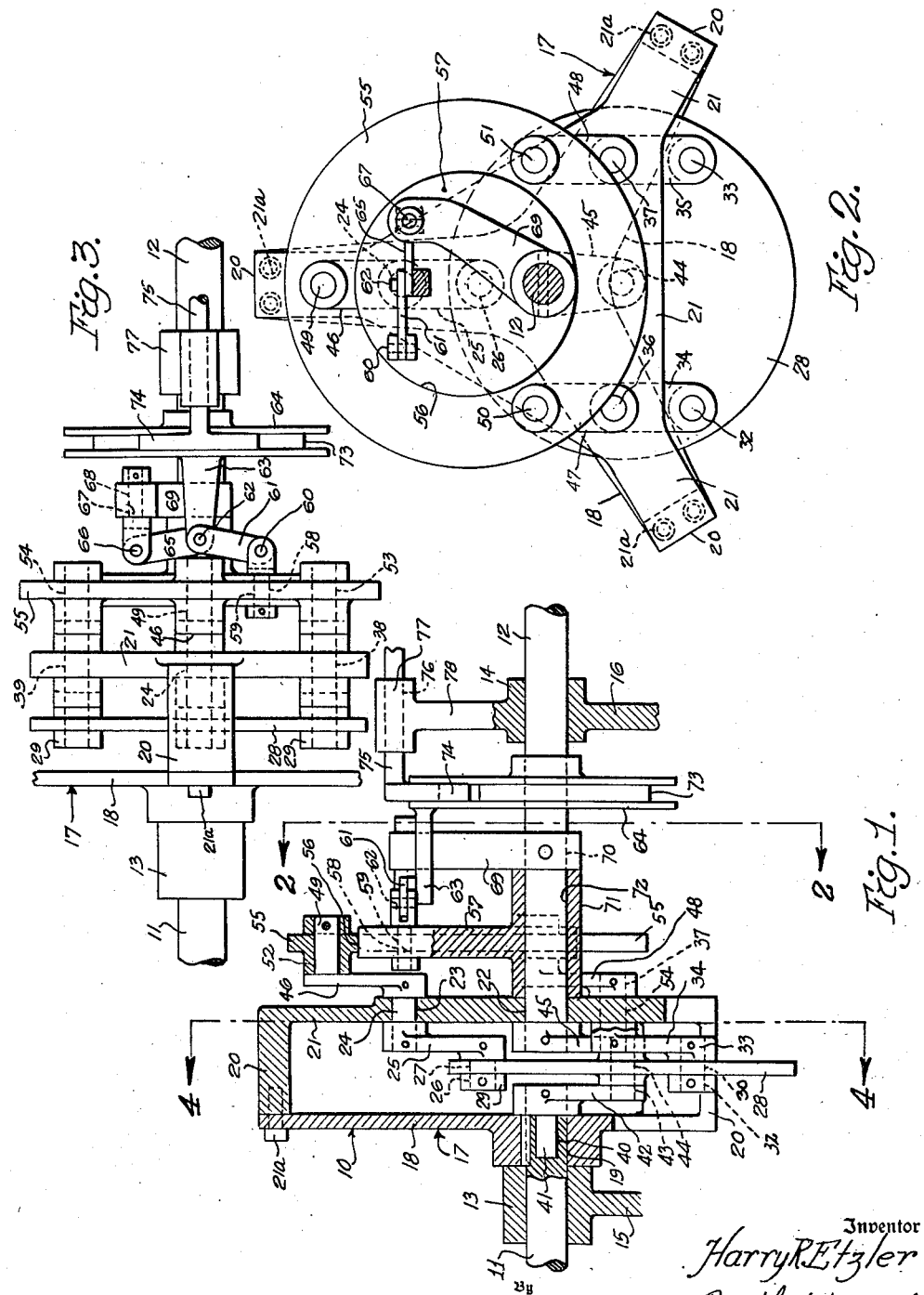
Inventor
Harry R Etzler
Barthel & Bugbee
Attorneys May 8, 1951
H. R. ETZLER
2,552,038
SHAFT COUPLING
Filed March 25, 1949
2 Sheets-Sheet 2
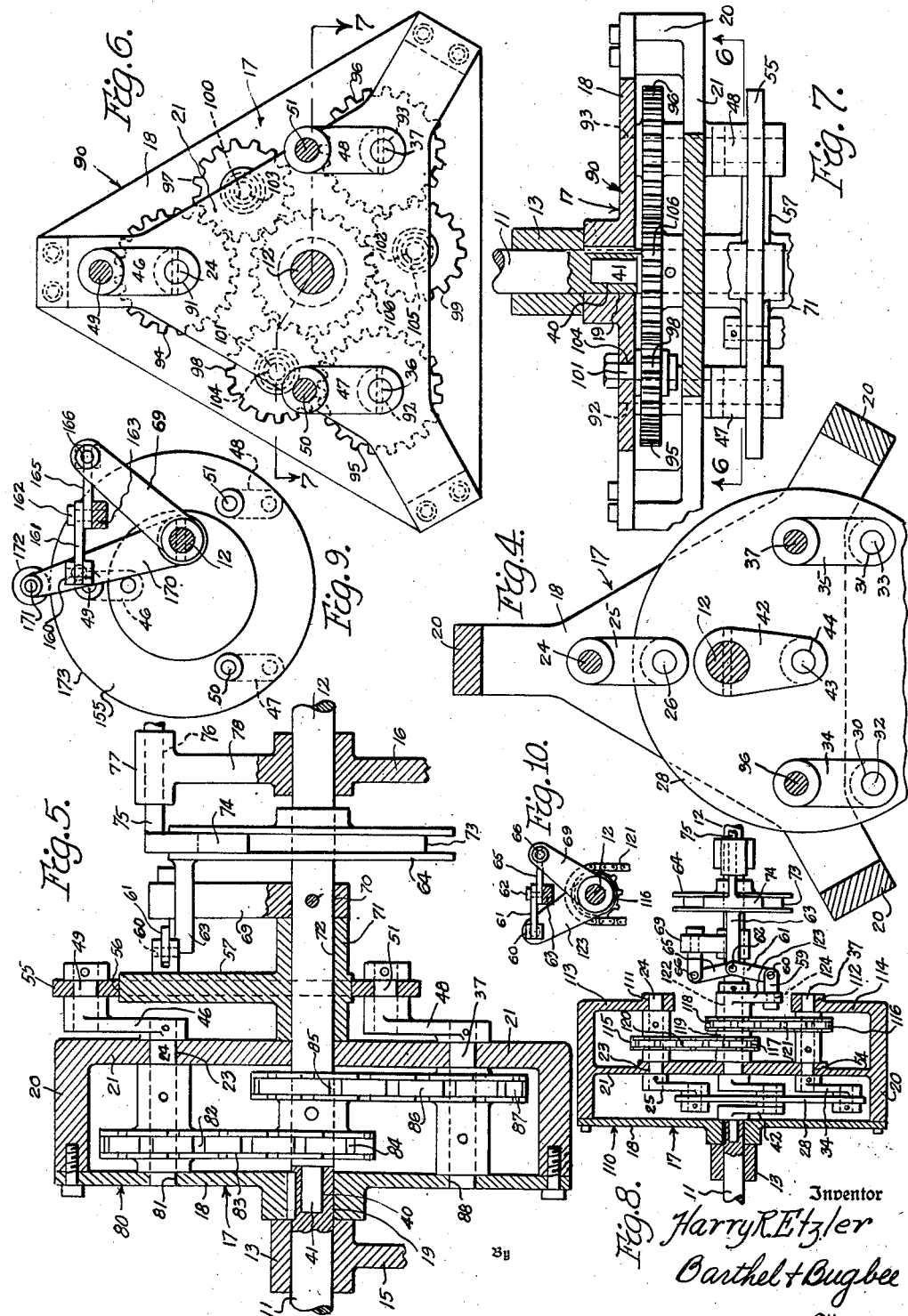
Inventor
Harry R Etzler
By Barthel & Bugbee
Attorneys Patented May 8, 1951

2,552,038

UNITED STATES PATENT OFFICE 2,552,038

SHAFT COUPLING

Harry R. Etzler, Mount Clemens, Mich.

Application March 25, 1949, Serial No. 83,400

5 Claims. (Cl. 74—63)

This invention relates to power transmitting devices and, in particular to shaft couplings for drivingly connecting and disconnecting a pair of rotary elements such as shafts.

One object of this invention is to provide a rotary element coupling whereby a driven element is normally drivingly disconnected from the driving element, but wherein a driving connection is established immediately upon applying pressure to a control member of the coupling.

Another object is to provide a rotary element coupling of the foregoing character wherein the coupling may be made to serve primarily as a clutch to transmit substantially all of the power from the driving element to the driven element when full pressure is applied to the control member, but which will also serve as a transmission when a lower pressure is applied to the control member, permitting slippage and therefore transmission of only a part of the load; and which will further serve as a brake if one of the rotary elements is connected to a stationary object such as the frame of a vehicle.

Another object is to provide a rotary element coupling of the foregoing character wherein the control member is mounted on a shaft which is eccentric to the driving and driven elements so that pressure on the control member creates a crowding action between members rotating on different centers of rotation, thereby causing the control member to rotate in an orbital path and drivingly interconnect the driving and driven elements.

Another object is to provide a rotary element coupling of the foregoing character wherein the driving and driven elements are connected by crank or eccentric cam mechanisms through the control member, or by sprocket chains and sprockets, or by intermeshing gearing or by combinations of such mechanisms.

In the drawings:

Figure 1 is a central vertical longitudinal section, partly in side elevation, of a rotary element coupling employing crank mechanisms, according to a preferred form of the invention;

Figure 2 is a vertical cross-section taken along the line 2—2 in Figure 1;

Figure 3 is a top plan view of the rotary element coupling shown in Figure 1;

Figure 4 is a vertical cross-section taken along the line 4—4 in Figure 1;

Figure 5 is a central vertical longitudinal section, partly in side elevation, of a modified rotary element coupling employing chain and sprocket mechanism combined with crank mechanism;

Figure 6 is a vertical cross-section through a portion of a further modified rotary element coupling employing intermeshing gearing in place of one of the crank mechanisms of Figure 1, taken along the line 6—6 in Figure 7;

Figure 7 is a substantially horizontal section taken along the line 7—7 in Figure 6;

Figure 8 is a horizontal section partly in top plan view of a still further modified rotary element coupling employing a crank mechanism combined with a chain and sprocket mechanism in the reverse arrangement from the modification shown in Figure 5;

Figure 9 is a vertical cross-section of a still further modification of the control mechanism shown in Figure 2 but having external rather than internal contact between the control members; and Figure 10 is a vertical cross-section, showing the control mechanism employed in the modified coupling of Figure 8.

Referring to the drawings in detail, Figure 1 shows a rotary element coupling, generally designated 10, whereby a driving element 11 and a driven element 12, such as the shafts so designated in the drawing, are drivingly connected or disconnected according to the action of the control mechanism and the interconnecting mechanism described below. The section of the shafts 11 and 12 as driving and driven shafts is purely optional since the shaft 12 may serve as a driving shaft and the shaft 11 as a driven shaft, if so desired. The shafts 11 and 12 are journaled in bearings 13 and 14 respectively mounted on bearing brackets 15 and 16.

Keyed or otherwise drivingly secured to the shaft 11 is a rotatable supporting structure, generally designated 17, including an eccentrically mounted plate 18 bored as at 19 to receive the shaft 11. Secured to the plate 18 are the axially extending bridge portions 20 of a second plate 21, as by the bolts 21a. The second plate 21 is bored as at 22 to loosely receive the driven shaft 12. Journaled in a bore 23 in the second plate 21 is a crank shaft 24. Drivingly secured to one end of the crank shaft 24 is a crank 25 having a crank pin 26 passing through a bore 27 in a disc 28 (Figure 4) and held in place by a retaining collar 29 pinned or otherwise secured to the crank pin 26. Journaled in bores 30 and 31 (Figure 4) respectively in the disc 28 are the crank pins 32 and 33 on the ends of the cranks 34 and 35 drivingly secured to crank shafts 36 and 37 connected to and journaled in bores 38 and 39 (Figure 3) in the second plate 21.

Journaled in the socket 40 in the inner end of the driving shaft 11 is a crank shaft 41 coaxial with the shafts 11 and 12 and having a crank 42 pinned or otherwise secured thereto (Figure 1). The crank carries a crank pin 43 which is journaled in a bore 44 in the disc 28. The crank pin 43 on the opposite side of the disc 28 carries a crank 45 which is pinned or otherwise drivingly secured to the inner end of the driven shaft 12. Pinned or otherwise drivingly secured to the opposite ends of the crankshafts 24, 36 and 37 are cranks 46, 47 and 48 respectively carrying crank pins 49, 50 and 51 journaled in bores 52, 53 and 54 respectively in a control ring 55 (Figures 2 and 3). The control ring 55 is provided with a circular aperture 56 (Figure 2) in which a disc or cam 57 is mounted, with a slight clearance between the two. Mounted in a bore 58 in the disc 57 is a pin 59 (Figures 1 and 3) having a yoked end connected by a pivot pin 60 to a link 61, the opposite end of which is connected by a pivot pin 62 mounted in an arm 63 which projects axially from the peripheral portion of a grooved pulley 64, the hub of which is loosely and slidably mounted on the driven shaft 12. Also mounted on the pivot pin 62 is one end of a link 65, the opposite end of which is pivoted to a pivot pin 66 connected to the yoked end of a pin 67 mounted in a bore 68 in the upper end of an arm 69. The lower end of the arm 69 is bored as at 70 to receive the driven shaft 12, to which it is pinned or otherwise drivingly secured. The ring 55 is provided with a hub 71 which is bored as at 72 (Figure 1) for the passage of the driven shaft 12 which passes loosely through the bore 72. Engaging the peripheral groove 73 in the pulley 64 is the forked portion or shift yoke 74 of a shift rod 75. The latter is reciprocably mounted in a bore 76 parallel to the axis of the driven shaft 12 and contained in a bearing 77 mounted on the upper extension 78 of the bearing bracket 16 (Figure 1).

In the operation of the rotary element coupling 10, power is applied to the driving shaft 11 and the driven shaft 12 is connected to the load or machine which is to be driven. So long as axial pressure is not applied to the shift rod 75, the driving shaft 11 and plates 18 and 21 rotate loosely and freely relatively to the driven shaft 12, and no power is transmitted to the driven shaft 12. To transmit power and couple the shafts 11 and 12, the operator applies pressure to shift the shift rod 75 and shift yoke 74 to the left (Figures 1 and 3), shifting the grooved pulley 64 to the left and consequently moving its arm 63 and its pivot pin 62 to the left. Since the pivot pin 66 is fixedly carried by the arm 69, the toggle action upon the links 61 and 65 tends to cause them to straighten out and consequently causes the pivot pin 60 to move outward until the disc or cam 57 is crowded against the bore 56 of the control ring 55. If only a slight pressure is applied to the shift rod 75, a slippage occurs in the mechanism between the driving and driven shafts 11 and 12. If, however, a sufficiently firm pressure is applied to the shift rod 75, the disc 57 is crowded tightly against the bore 56 of the control ring 55 so that slippage is prevented and the driving shaft 11 is drivingly connected to the driven shaft 12 in one-to-one ratio. Thus, merely by shifting the shift rod 75, the operator can drivingly connect or disconnect the driving and driven shafts 11 and 12 at will, and by varying the pressure applied to the shift rod 75, he can obtain a controlled slippage between the driving and driven shafts 11 and 12.

The modified shaft coupling, generally designated 80, shown in Figure 5 is identical in construction, for the most part, to the form of the invention shown in Figures 1 to 4 inclusive, particularly as regards the parts to the right of the line 4—4 in Figure 1, and corresponding parts are therefore designated with the same reference numerals. In place of the crank mechanism located between the plates 18 and 21 in Figure 1, however, the modification of Figure 5 employs chain and sprocket mechanism for transmitting the motion. In particular, the crank shaft 24 is extended so that it is journaled not only in the bore 23 in the plate 21 but also in a bore 81. Pinned or otherwise drivingly secured to the crank shaft 24 is a sprocket 82 drivingly connected by a sprocket chain 83 to a sprocket 84 which is likewise pinned or otherwise drivingly secured to the driven shaft 12.

Also secured in a similar manner to the shaft 12 is a second sprocket 85 which is drivingly connected by a sprocket chain 86 to a sprocket 87. The latter is pinned or otherwise drivingly secured to the crankshaft 37 which is extended in a manner similar to the crankshaft 24 so that it is journaled not only in the bore 54 but also in a bore 88 in the plate 18. As in Figure 1, the cranks 46 and 48 transmit the motion onward to the parts shown to the right of the plate 21, the crankshaft 36 and its crank 47 of Figure 1 being omitted in Figure 5. The operation of the modification of Figure 5 is similar to that of Figure 1 and hence requires no repetition, except that the motion is transmitted from the crankshafts 24 and 37 to the driven shaft 12 by means of the sprocket chains 83 and 86 and the sprockets 82, 84 and 85, 87 instead of the crank mechanism of Figure 1.

The modified shaft coupling, generally designated 90, shown in Figures 6 and 7 is also generally similar to that shown in Figures 1 to 4 inclusive and similar parts are likewise similarly designated with reference numerals. The shaft coupling 90, however, in place of the crank mechanism of Figure 1 or the chain and sprocket mechanism of Figure 5 located between the plates 18 and 21, in Figures 6 and 7 employs intermeshing gearing for transmitting the motion. In particular, the crankshafts 24, 36 and 37 are extended across the space between the plates 18 and 21 journaled in bores 91, 92 and 93. Only the bores 92 and 93 are shown in Figure 7, which is a horizontal section taken approximately in a plane, designated 7—7 in Figure 6, below the crankshaft 24, but the bore 91 is similar to the bore 81 of Figure 5 and located in a similar position on the plate 18. Pinned or otherwise drivingly secured to the crankshafts 24, 36 and 37 are gears 94, 95 and 96 respectively meshing with idler pinions 97, 98 and 99 mounted on stub shafts or studs 100, 101 and 102. The plate 18 is provided with three appropriately located bores 103, 104 and 105 respectively for receiving the stub shafts or studs 100, 101 and 102, only the bore 104 and the shaft or stud 101 being shown clearly in Figure 7.

Meshing with the idler pinions 97, 98 and 99 is a central gear 106 which in turn is keyed or otherwise drivingly secured to the driven shaft 12. The remainder of the mechanism is similar to that described in detail in connection with Figures 1 to 4 inclusive, and as the operation is correspondingly similar, no repetition is necessary except to state that the motion is transmitted from the crankshafts 24, 36 and 37 to the driven shaft 12 by means of the crankshaft gears 94, 95 and 96, the idler pinions 97, 98 and 99 and the central gear 106.

The modified shaft coupling, generally designated 110, shown in Figures 8 and 10 is, in substance, a reversal of the mechanism shown in the shaft coupling 80 of Figure 5, in that the crank mechanism and chain and sprocket mechanisms are interchanged. In particular, the mechanism to the left of the plate 21 is substantially the same as that shown in Figure 1 except that the crankshaft 36 is omitted, along with its crank 47. It will be obvious, however, that two such cranks and crankshafts may be used instead of the three cranks and crankshafts shown in Figure 1, but three or more are preferred. In the coupling 110 of Figure 8, the crankshafts 24 and 37 are extended to the right of the plate 21 instead of to the left as in Figures 5 and 7, and journaled in bores 111 and 112 in bracket portions 113 and 114 extending to the right from the plate 21.

Pinned or otherwise drivingly secured to the crankshafts 24 and 37 are sprockets 115 and 116 respectively connected to double sprockets 117 and 118 on a common hub 119 by sprocket chains 120 and 121 respectively. The hub 119 of the twin sprockets 117 and 118 has a bore 122 loosely receiving the driven shaft 12. Extending radially from the hub 119 is an arm 123 bored as at 124 to directly receive the pin 59 of the control mechanism, the bore 124 in this respect corresponding to the bore 58 of the disc or cam 57 (Figure 3). The remainder of the mechanism to the right of the arm 123 including the toggle links 61 and 65 and the arm 69 (Figure 10) is substantially identical to that shown in Figure 3.

The operation of the modified shaft coupling 110 is also similar to that of the shaft coupling 10 of Figures 1 to 4 inclusive, except that the chains 120, 121 and the sprockets 115, 117 and 116, 118 transmit the motion instead of the crank mechanism of Figures 1 to 4 inclusive. So long as there is no force exerted on the rod 75 and the toggle links 61 and 65 remain broken or at an angle to one another, the rotation of the shaft merely causes rotation of the plates 18 and 21 and their bridge portions 20. This in turn merely causes the sprockets 115 and 116 to rotate in orbital paths around the sprockets 117 and 118 so that the sprockets 117 and 118 remain motionless as the chain merely wraps itself around one side of the sprocket while it unwraps from the other side. Consequently, the driven shaft 12 fails to rotate and any mechanism to which it is connected is stationary.

When the operator shifts the control rod 75 and consequently the pulley 64 to the left so as to straighten out the toggle links 61 and apply a force to the arm 123 resisting the free rotation of the chain and sprocket mechanism, the thrust thus set up causes the entire assembly to the right of the plate 21 to rotate, consequently transmitting this rotation through the arm 69 to the driven shaft 12 for either direction of rotation. When the force on the control rod 75 is released, however, the toggle links 65 and 61 resume their original positions shown in Figures 3 and 8 and no motion is transmitted to the shaft 12.

The modified control device, generally designated 130 shown in Figure 9 is similar in purpose to the control mechanism shown in Figure 2, and is similarly connected to the remainder of the mechanism. In the control device 130, however, the corresponding parts bear the same numbers as the similar parts in Figure 2, increased by 100. In addition to the parts so numbered, the control device is provided with an arm 170 having its hub or inner end loosely mounted upon the driven shaft 12. Mounted on the outer end of the arm 170 is an axle 171 carrying a contact roller 172 which is forced into contact with the periphery 173 of the eccentric ring 155, when the control rod 75 (not shown) and consequently the pulley arm 163 are pushed forward to straighten out the toggle links 165 and 161. The control device 130 may therefore be substituted for the control device shown in Figure 2, the difference being that in Figure 2, the disc 57 acts like a cam forced into pressure contact with the bore 56 in the ring 55, whereas in Figure 9, the roller 172 is pulled inward into contact with the periphery 173 of the ring 155, corresponding to the ring 55 of Figure 2.

What I claim is:

1. A rotary element coupling comprising a first rotary element, a second rotary element coaxial with said first rotary element and rotatable independently thereof, a rotatable supporting structure drivingly connected to said first rotary element and rotatable therewith, a plurality of rotatable shafts journaled in said structure on axes of rotation spaced transversely from the axis of rotation of said rotary elements, a rotatable control device loosely and rotatably mounted on said second rotary element for rotation independently thereof, a first connecting mechanism drivingly and rotatably connecting said shafts to said second rotary element, a second connecting mechanism drivingly and rotatably connecting said shafts to said control device, one of said mechanisms including cranks connected to said shafts and a connecting member interconnecting said cranks, a reaction member connected to said second rotary element and extending outwardly from the axis thereof, and a selectively operable coupling actuator operatively connecting and disconnecting said control device respectively to and from said reaction member.

2. A rotary element coupling comprising a first rotary element, a second rotary element coaxial with said first rotary element and rotatable independently thereof, a rotatable supporting structure drivingly connected to said first rotary element and rotatable therewith, a plurality of rotatable shafts journaled in said structure on axes of rotation spaced transversely from the axis of rotation of said rotary elements, a rotatable control device loosely and rotatably mounted on said second rotary element for rotation independently thereof, a first connecting mechanism drivingly and rotatably connecting said shafts to said second rotary element, a second connecting mechanism drivingly and rotatably connecting said shafts to said control device, one of said mechanisms including cranks connected to said shafts and a connecting member interconnecting said cranks, a reaction member connected to said second rotary element and extending outwardly from the axis thereof, and a selectively operable coupling actuator operatively connecting and disconnecting said control device respectively to and from said reaction member, said control device including a rotary member having an arcuate contact surface thereon and a contact member connected to said actuator and movable thereby into and out of engagement with said arcuate contact surface.

3. A rotary element coupling comprising a first rotary element, a second rotary element coaxial with said first rotary element and rotatable independently thereof, a rotatable supporting structure drivingly connected to said first rotary element and rotatable therewith, a plurality of rotatable shafts journaled in said structure on axes of rotation spaced transversely from the axis of rotation of said rotary elements, a rotatable control device loosely and rotatably mounted on said second rotary element for rotation independently thereof, a first connecting mechanism drivingly and rotatably connecting said shafts to said second rotary element, a second connecting mechanism drivingly and rotatably connecting said shafts to said control device, one of said mechanisms including cranks connected to said shafts and a connecting member interconnecting said cranks, a reaction member connected to said second rotary element and extending outwardly from the axis thereof, and a selectively operable coupling actuator operatively connecting and disconnecting said control device respectively to and from said reaction member, said control device including a rotary annular member having an arcuate internal contact surface thereon, and a contact member connected to said actuator and movable thereby into and out of engagement with said arcuate contact surface.

4. A rotary element coupling comprising a first rotary element, a second rotary element coaxial with said first rotary element and rotatable independently thereof, a rotatable supporting structure drivingly connected to said first rotary element and rotatable therewith, a plurality of rotatable shafts journaled in said structure on axes of rotation spaced transversely from the axis of rotation of said rotary elements, a rotatable control device loosely and rotatably mounted on said second rotary element for rotation independently thereof, a first connecting mechanism drivingly and rotatably connecting said shafts to said second rotary element, a second connecting mechanism drivingly and rotatably connecting said shafts to said control device, one of said mechanisms including cranks connected to said shafts and a connecting member interconnecting said cranks, a reaction member connected to said second rotary element and extending outwardly from the axis thereof, and a selectively operable coupling actuator operatively connecting and disconnecting said control device respectively to and from said reaction member, said control device including a rotary annular member having a circular internal contact surface thereon, and a contact member connected to said actuator and movable thereby into and out of engagement with said circular contact surface.

5. A rotary element coupling comprising a first rotary element, a second rotary element coaxial with said first rotary element and rotatable independently thereof, a rotatable supporting structure drivingly connected to said first rotary element and rotatable therewith, a plurality of rotatable shafts journaled in said structure on axes of rotation spaced transversely from the axis of rotation of said rotary elements, a rotatable control device loosely and rotatably mounted on said second rotary element for rotation independently thereof, a first connecting mechanism drivingly and rotatably connecting said shafts to said second rotary element, a second connecting mechanism drivingly and rotatably connecting said shafts to said control device, one of said mechanisms including cranks connected to said shafts and a connecting member interconnecting said cranks, and the other mechanism including cranks connected at their inner ends to said shafts and at their outer ends to said control device, a reaction member connected to said second rotary element and extending outwardly from the axis thereof, and a selectively operable coupling actuator operatively connecting and disconnecting said control device respectively to and from said reaction member.

HARRY R. ETZLER.

REFERENCES CITED

The following references are of record in the file of this patent:

UNITED STATES PATENTS

| Number | Name | Date |
|---|---|---|
| 659,275 | Williamson | Oct. 9, 1900 |
| 846,350 | Rothe | Mar. 5, 1907 |
| 1,010,935 | Meek | Dec. 5, 1911 |
| 1,440,575 | Anderson | Jan. 2, 1923 |

FOREIGN PATENTS

| Number | Country | Date |
|---|---|---|
| 510,797 | Great Britain | Aug. 8, 1939 |